United States Patent
Vasic et al.

(10) Patent No.: US 7,478,757 B2
(45) Date of Patent: Jan. 20, 2009

(54) METHOD AND DEVICE FOR THE AUTHENTICATION OF DOCUMENTS AND GOODS

(75) Inventors: Milan Vasic, Geneva (CH); Edgar Muller, Fribourg (CH)

(73) Assignee: SIPCA Holding S.A., Prilly (CH)

( * ) Notice: Subject to any disclaimer, the term of this patent is extended or adjusted under 35 U.S.C. 154(b) by 229 days.

(21) Appl. No.: 10/553,972

(22) PCT Filed: Apr. 5, 2004

(86) PCT No.: PCT/EP2004/003600

§ 371 (c)(1),
(2), (4) Date: Oct. 19, 2005

(87) PCT Pub. No.: WO2004/097716

PCT Pub. Date: Nov. 11, 2004

(65) Prior Publication Data
US 2006/0204145 A1     Sep. 14, 2006

(30) Foreign Application Priority Data
Apr. 29, 2003  (EP) .................................. 03009605

(51) Int. Cl.
*G06K 19/06* (2006.01)
(52) U.S. Cl. .................. 235/491; 235/436; 235/462.32; 235/487
(58) Field of Classification Search .................. 235/491, 235/436, 454, 462.32, 462.42, 487
See application file for complete search history.

(56) References Cited

U.S. PATENT DOCUMENTS

| | | | |
|---|---|---|---|
| 5,586,212 A | 12/1996 | McConica et al. | |
| 5,743,633 A | 4/1998 | Chau et al. | |
| 5,932,860 A * | 8/1999 | Plesko | ......................... 235/454 |
| 6,042,012 A | 3/2000 | McQueen et al. | |
| 6,172,745 B1 | 1/2001 | Voser et al. | |
| 2002/0031266 A1 | 3/2002 | McGrew | |

FOREIGN PATENT DOCUMENTS

| | | |
|---|---|---|
| DE | 2033183 | * 12/1976 |
| WO | WO 02/31780 | 4/2002 |

* cited by examiner

*Primary Examiner*—Seung H Lee
(74) *Attorney, Agent, or Firm*—Shoemaker and Mattare (57) ABSTRACT

The invention discloses a method and a device for the authentication of a document, a valued good or a packaging, carrying a marking (M) exhibiting a viewing-angle dependent light reflection spectrum. The authentication method is based on a measurement of the intensity of light reflected by the marking at least at two different viewing angles in response to a sequential wide-angle illumination with light of different spectral characteristics, and the comparison of the measured intensity values with corresponding reference values. The authentication device (1) has at least two light sources (4) of different spectral characteristics, a wide-angle illumination optics (3), and at least two photodetectors (5) collecting light reflected by said markings at least at two different viewing angles. It may further have a programmed "learning mode" for measuring and storing a set of reflected intensity values of a reference item, and a programmed "testing mode", for measuring a corresponding set of intensity values on an item to be authenticated and comparing them with the previously stored set of reference values, hereby deriving and indicating a test result.

24 Claims, 6 Drawing Sheets

METHOD AND DEVICE FOR THE AUTHENTICATION OF DOCUMENTS AND GOODS

The invention concerns a method and a corresponding device for determining the authenticity of a security document, a valued good or a packaging, carrying a marking which exhibits a viewing-angle dependent light reflection spectrum.

BACKGROUND OF THE INVENTION

Security documents and valued goods are marked with materials exhibiting particular physical or chemical properties (security features), which serve to authenticate the marked items through a detection of the presence of said properties.

A common way to mark a security document or a valued good comprises the incorporation of one or more marking materials into a printing ink or a coating composition, which is subsequently applied to said document or good, if needed in the form of indicia. Alternative ways to mark an article comprise the incorporation of one or more marking materials into the bulk (plastic, paper, liquid, etc.) of the article.

Physical properties which have been used as a security feature include noteworthy selective spectral light absorption in the ultraviolet (UV), visible, and infrared (IR) wavelength range, as well as prompt and delayed UV-, visible-, and IR-luminescence, such as disclosed e.g. in U.S. Pat. Nos. 3,473,027; 3,412,245; 3,582,623; 3,663,813; 3,650,400; 3,566,120; 3,455,577; and 4,202,491. Security features allowing for a contact-less detection respectively reading of the marking, e.g. by optical means, were always perceived as a preferred option.

Markings exhibiting a viewing-angle dependent light reflection spectrum ("optically variable devices", OVDs) are used as an efficient anti-copy means on bank notes and security documents. Among the OVDs, optically variable inks (OVI®; EP 227,423 B1) have acquired a preeminent position since their first introduction on currency back in 1987. Such inks are formulated on the basis of optically variable pigment (OVP), a preferred type of OVP being the flaky thin-film optical interference device described in U.S. Pat. Nos. 4,705,300; 4,705,356; 4,721,217; 4,779,898; 4,930,866; 5,084,351 and in related disclosures. Other useful types of OVP comprise the multiply coated particles described in U.S. Pat. Nos. 5,624,486 and 5,607,504.

Still another, useful type of optically variable pigments is obtained through the photo-polymerization of a thin film of cholesteric (i.e. chiral-nematic) liquid crystal material, followed by comminuting the polymer film into a pigment, such as described in U.S. Pat. Nos. 5,807,497 and 5,824,733. Said liquid crystal based (LC-) pigments have the additional property of reflecting, depending upon their internal chirality, selectively either right-handed or left-handed circularly polarized light, as disclosed in EP 899,119 B1. As the LC-pigments can be made in either, right- or left-handed chirality, the circular polarization sense of the reflected light from LC-pigment can be exploited to impart an additional, covert security feature to a document or article.

Still another type of optically variable devices can be realized on the basis of diffraction gratings, e.g. in the form of embossed holograms or similar devices carried on a metallized polymer foil which is applied to a document or an article. Said embossed polymer foil can also be comminuted into a pigment and used as 'glitter' in a coating composition.

In still another, somewhat less efficient way, a diffraction grating is embossed into preformed, pigment-size metal (aluminum) flakes. In all these embodiments, the required diffraction grating structure has a line spacing comparable with the wavelength of the diffracted light, i.e. typically of the order of 300-500 nanometers, corresponding to 2,000 or more lines per mm.

Optically variable pigments, inks and printed features, as well as optical diffraction devices, can be identified by assessing their spectral reflection properties for at least two different angles of view. Such information is commonly obtained in the laboratory with the help of a gonio-spectrometer (e.g. as manufactured by Zeiss), as described by R. Maisch and M. Weigand in "Perlglanzpigmente", $2^{nd}$ edition, Die Bibliothek der Technik, Vol 56, Verlag Moderne Industrie AG, Landsberg/Lech, 1992 and in the cited references therein. A gonio-spectrometer allows noteworthy to study a sample under any combination of illumination angle and spectral analysis angle.

In preferred technology, the detector cost is kept low by avoiding the use of spectrometers and adopting the sequential color-LED illumination technique disclosed in U.S. Pat. No. 4,204,765. This document describes a device for testing colored securities, such as paper having colored areas imprinted thereupon. A plurality of light emitting diodes (LEDs), each emitting light of a different wavelength range, sequentially illuminate a determined area on said paper, which is more or less reflective for the incident light. A single photodetector receives the light reflected by the paper and delivers an electric signal corresponding to the received light intensity. By comparison of the measured signals for the various LEDs with predefined reference values, an indicator of the authenticity of said paper is derived.

The technology disclosed in U.S. Pat. No. 4,204,765, although it is very compliant with a low-cost device, is not suitable for the testing of optically variable security features due to its single observation-angle design.

A system for the automated verification of optically variable features on value documents, bank notes, etc. has been disclosed in WO 01/54077. According to this disclosure, the optically variable feature is illuminated at least with a first and with a second light beam, and the light reflected from it is analyzed for at least a first and a second observation angle. The automated verification technology disclosed in WO 01/54077 has, however, a number of shortcomings which prevent in particular its practical implementation in low-cost automatic reader devices.

A first shortcoming of the technology of WO 01/54077 is tied to the measurement geometry. The disclosed device illuminates the optically variable feature at predetermined incidence angles using directional light beams, and spectrally analyzes the light reflected from the illuminated feature at predetermined reflection angles related to said incidence angles. For optically variable ink, the incident and reflected light beams roughly obey the mirror law, i.e. the incidence and reflection angles are about opposed-equal. This is not the case for optically variable devices based on holographic diffraction gratings, where incidence and reflection angle can be generally different from each other. By fixing both, incidence and reflection angle in the hardware lay-out, the system of WO 01/54077 can thus only be used for the authentication of the very determined type of OVDs for which it was conceived.

A second shortcoming of the technology of WO 01/54077 is in the expensive nature of the components used. Two or more spectrometers are noteworthy required to analyze the light collected at two or more different angles of reflection.

The cost of an authentication device containing spectrometers is likely to prevent its use in an automatic vending machine for low-cost products.

A third major shortcoming of the technology of WO 01/54077 lies finally in its lack of miniaturize-ability. Noteworthy, the analysis of spectral reflectance data at near-grazing incidence is likely to result in a physically extended measurement set-up. This in turn is a rather prohibitive constraint for applications in automated vending machines, where severe space restrictions must be obeyed.

SUMMARY OF THE INVENTION

The present invention discloses a method and a corresponding device for the authentication of optically variable features on documents or articles, particularly commercial good packaging, which overcomes the shortcomings of the prior art. The disclosed device is, as to its miniaturize-ability and its reduced cost, particularly suited for applications in vending machines, automatic readers and hand-held testing devices. Furthermore, it is aimed to be generally applicable to the authentication of any type of OVD, using one and the same hardware lay-out.

The device for determining the authenticity of an item such as a security document, a valued good or a packaging, carrying a marking exhibiting a viewing-angle dependent light reflection spectrum comprises thus:

- at least two light sources having different spectral characteristics for providing illumination to said marking;
- wide-angle illumination optics for guiding the light of said light sources to said marking;
- at least two photodetectors with optional collection optics for collecting light reflected by said marking at least at two predefined different observation angles and delivering an electric signal corresponding to the collected light intensity;
- analog-to-digital converting means, processing means, controlling means and memory means, suitable for controlling the light sources, for digitizing and storing reflected intensity values, for comparing said intensity values with previously stored corresponding reference values, and for deriving an authenticity indicator from the comparison result, all according to a predefined algorithm, and using a pre-established decision criterion.

The device is characterized in that it comprises a wide-angle illumination optics for guiding the light of said light sources to said marking. Preferably, the wide-angle illumination optics are capable of illuminating the marking simultaneously under a plurality of incidence angles ranging from orthogonal to grazing incidence.

According to the present invention, the optically variable device (OVD), i.e. the marking under test is illuminated with the help of a relatively simple and low-cost wide-angle illumination optics. Said wide-angle illumination optics is fed with different illuminations, i.e. light from a plurality of spectrally different light sources, such as LEDs, which are sequentially switched on and off. The OVD receives thus light of sequentially changing color simultaneously under all incidence angles, i.e. from substantially orthogonal to substantially grazing incidence.

All angular color discrimination is thus exclusively performed in the detection chain, where the light reflected from the OVD is collected at two or more different predetermined angles and where its intensity is converted by photodetectors into corresponding electric signals. This way of proceeding has the advantage that the device of the present invention can be used without modification for the authentication of all types of OVDs, be they of the 'optically variable ink' or of the 'diffraction grating' type.

The wide-angle illumination optics of the invention can be chosen from all kind of devices which allow to diffusely illuminate a part of a surface simultaneously under all incidence angles with the light of one or more determined 'point' light sources. Wide-angle illumination optics devices are known in the art and commercially available, e.g. in the form of diffuser plates, diffuse illumination spheres, non-imaging optics elements, etc. The preferred wide-angle illumination optics device in the context of the present invention is a Compound Parabolic Concentrator (CPC, also called "optical acceptance-angle transformer"), such as described by R. Winston et al. in "Selected Papers on Nonimaging Optics" SPIE publication MS 106, 1995.

A Compound Parabolic Concentrator (CPC) is characterized by a longitudinal section which is delimited by two parabolic elements (P1, P2; FIG. 1c), having parallel axes and being arranged such that said parabolic elements' focal points (f1, f2) lie each on the respective other parabolic element. The CPC can be made in the form of a 2-dimensional slab or in the form of a 3-dimensional cone (rotational body). It can further be made either as an internally reflecting hollow-body, or as a solid dielectric body, which latter may further carry a reflecting coating or a mirror on part of its outer surface.

The CPC has a first (A1) and a second (A2) aperture area, and a first and a second acceptance angle for incoming or outgoing light, whereby said first aperture area is wide and has a narrow acceptance angle, and said second aperture area is narrow and has a wide acceptance angle. Light falling into the first aperture area of the CPC within its acceptance angle is emitted from the second aperture area of the CPC within its acceptance angle, and vice-versa.

The incoming light to the CPC is furthermore scrambled, such that a single light source, located anywhere in front of said first aperture area of the CPC, will illuminate the whole second aperture area of the CPC under all angles which are comprised within its acceptance angle. A CPC, and more generally any other suitable non-imaging optics device, can thus be advantageously used to convert the emission of a plurality of LEDs located in front of its first, larger aperture area to a hemispherical diffuse illumination of the sample located in front of its second, smaller aperture area.

According to the invention, the CPC or other non-imaging optics element is preferably made of a solid dielectric material, such as acrylic glass (PMMA) or a similar optical polymer. This has the advantage of conferring ruggedness to the whole device, whilst facilitating its mechanical assembly. The light sources of the illuminator are assembled in front of the larger aperture area of the CPC, e.g. within bores provided in its body. Said light sources are preferably chosen to be of the wide-angle emitting type.

At least two spectrally different light sources are needed; they are preferably chosen as light emitting diodes (LEDs). In a preferred embodiment of the invention, the device comprises a plurality of LEDs, i.e. four to twelve LEDs of different emission wavelengths. The LED's are preferably chosen to emit in the range from the UV (300 nm) to the remote NIR (2,500 nm), more preferably from the UV (300 nm) to the close NIR (1,100 nm). Optionally, said light emitting diodes (LED) may carry optical filters which cut away part of their original emission spectrum, in order to obtain more particular spectral emission profiles. Said optical filter may hereby be of the band-pass (including multi-band-pass), the high-pass or the low-pass type.

Light sources other than LEDs may, however, also be used, such as incandescent light sources provided with the required optical filters. Laser diodes may be used as the light sources of choice in cases where a particularly narrow spectral illumination profile is needed. The output of the laser diode is, according to the present invention, not collimated by an optical element to form a laser beam, but rather used in diverging mode and further diffused by the illuminator optics. The device may also comprise light sources emitting in the UV below 200 nm or in the IR above 2,500 nm wavelength.

The task of miniaturization is solved, according to the present invention, by using at least two optical fibers for collecting reflected light from the optically variable feature at both, a near orthogonal angle (preferably between 0° and 45°; even more preferably between 0° and 35°) and a near grazing angle (preferably between 45° and 90°; even more preferably between 50° and 80°), with respect to the normal to the plane of the marking. Optical fibers can noteworthy be bent, and allow to reduce the physical size of the required lay-out for detection at grazing angle.

The task of miniaturization is even most advantageously solved by the combination of a solid dielectric non-imaging optics illuminator element with at least two optical collecting fibers solidly embedded within its body. The collecting angles in such an assembly are kept fixed by the mechanical lay-out of the illuminator, such as to result in a very rugged design. Said at least two optical collecting fibers collect light from the sample under predetermined viewing angles and within the optical aperture cone of the respective fiber ends, and lead it to corresponding photodetectors, disposed in front of the larger aperture area of the CPC, e.g. within bores provided in its body.

The said photodetector is preferably a photodiode. Further preferred, for reducing electronic measurement noise, is a photodetector built as an integrated photodetector unit which comprises a photodiode and a subsequent signal amplifier, as well as, optionally, an optical filter. The signal amplifier may be of the transimpedance type. The optical filter may be of the band-pass (including multi-band-pass), the high-pass or the low-pass type. Corresponding photodetectors and photodetector units are known to the skilled man and commercially available from several manufacturers, e.g. from Hamamatsu, Japan.

Silicon photodiodes may noteworthy be used for the wavelength range from the UV to the close NIR (200 nm to 1,100 nm). Germanium and InGaAs photodiodes may be used for the remote NIR wavelength range (900 nm to 1,700 nm or 2,500 nm, respectively). GaAsP photodiodes are suited for the UV and visible wavelength range (200 nm to 700 nm). GaN, SiC and GaP photodiodes may finally be used for the UV wavelength range (below 400 nm).

In a particular embodiment, said photodetector comprises a circular polarization filter, transmitting either the left- or the right-handed fraction of the reflected and collected light. Discrimination of circular polarization is particularly interesting in the case of OVDs based on cholesteric liquid crystal (CLC) materials, which can be made such as to reflect either only one of both circular polarizations of light, or to reflect both of them. A corresponding authentication device can be made to comprise four photodetectors, i.e. each a left-hand polarization sensitive and a right-hand polarization sensitive photodetector for each of a near orthogonal and a near grazing observation angle. The circular polarizer may hereby be inserted anywhere in light path leading from the reflecting marking via the collection and guiding optics to the said photodetector.

Said device for the authentication of documents and goods comprises further a processor (embodied e.g. by an electronic circuit comprising a micro-controller IC) comprising analog-to-digital converting means (for deriving digital, storable values from the photodetectors' primary output signals), memory means (for storing program, reference values and measurement data), driving means (for switching on and off external loads), control means (for accepting user input) and indicator means (for displaying output to the user), as well as the necessary power supply (e.g. a battery). Said processor is enabled to switch the individual LEDs of the illuminator on or off, to read, digitize and store the output signals of the photodetectors, to accept input from the user (e.g. from two or more manual pushbuttons), and to display output (e.g. to a "passed" and a "failed" indicator LED). According to an internally stored program, said processor is enabled to carry out a complete measurement/authentication cycle, including the final indication of a result. The technicality of such implementations is known to the skilled in the art of micro-controller applications.

Said internally stored program can noteworthy be laid out such that the device supports a 'learning mode' for measuring reflectance intensity values on a reference item and permanently storing them in internal memory, and a 'testing mode' for determining the authenticity of an item under test, by measuring its reflectance intensity values and comparing them with said previously measured and stored reference values, hereby deriving and indicating a result. Each of both modes can be activated by a corresponding control switch.

The device for authenticating items may additionally comprise further control means (e.g. a keyboard for more sophisticated user input), further indicating means (e.g. an alphanumeric display panel; a buzzer), electrical and/or optical connectors for power supply and data transfer purposes, communication means (e.g. an IR and/or a radio link), as well as an internal power supply (e.g. a battery or an accumulator) enabling a stand-alone operation.

Manual control means may serve for the activation or deactivation of the power supply, for the activation of the reference acquisition procedure or of the testing procedure, for selecting preferred reference values etc. Indicating means may serve to indicate the status of the device and the result of the measurement cycles performed. Connectors allow to transfer data between the device and external units, as well as to connect the device with an external power supply. Communication means allow for a wireless transfer of data (i.e. for maintenance) between the device and external units.

It is further possible in the context of the present invention, to equip the authentication device for the combined evaluation of optically variable properties with additional optical security properties. Using a different programming of the processing means, the same device can serve for the measurement and evaluation of those additional optical properties which may be prompt or delayed photoluminescence emission in the UV, in the visible or in the IR range of the spectrum, and which may include the measurement of time-dependent rise and decay characteristics of delayed luminescence emission. This is particularly useful for the authentication of luminescent optically variable devices, such as disclosed in WO 01/60924.

In another variant, the device can be laid out as to combine the above disclosed optical sensor elements with a magnetic sensor element. This is particularly useful for the authentication of magnetic optically variable devices, such as disclosed in WO 02/073250.

Within the context of the present disclosure, ultraviolet radiation (UV) shall be understood as having a wavelength between 200 nm and 400 nm, visible radiation as having a wavelength between 400 nm and 700 nm, close near infrared radiation as having a wavelength between 700 nm and 1,100 nm and remote near infrared radiation as having a wavelength between 1,100 nm and 2,500 nm. Infrared (IR) means radiation having a wavelength above 700 nm.

A prompt luminescence emission, or fluorescence, is defined as having a characteristic luminescence intensity decay time shorter than 1 microsecond. A delayed luminescence emission, or phosphorescence is defined as having a characteristic luminescence intensity decay time longer than 1 microsecond.

Incident angles are indicated with respect to normal to the plane of the optically variable feature, i.e. the line orthogonal to the tangent plane of the optically variable feature at the point of observation. Substantially orthogonal incidence shall mean an incidence angle which deviates not more than 10° from the feature's normal. Substantially grazing incidence shall mean an incidence angle which deviates not more than 10° from the plane of the feature.

The invention further comprises a method for determining the authenticity of an item such as a security document, a valued good or a packaging, carrying a marking exhibiting a viewing-angle dependent light reflection spectrum, the method comprising the steps of a) illuminating said marking with at least a first light source having first spectral characteristics;
b) collecting light reflected by said marking at least at two predefined different observation angles with respect to the plane of the marking, and measuring its respective intensity;
c) optionally storing the measured intensity values of step b) in a permanent digital memory;
d) illuminating said marking with at least a second light source having second spectral characteristics;
e) collecting light reflected by said marking at least at two predefined different observation angles with respect to the plane of the marking, and measuring its respective intensity;
f) optionally storing the measured intensity values of step e) in a permanent digital memory; and
g) comparing said measured intensity values of steps b) and e) with previously stored corresponding reference values according to a predefined algorithm, and deriving a authenticity indicator from the comparison result using a pre-established decision criterion;

The method is in particular characterized in that the illumination of steps a) and d) is a wide-angle illumination. Preferably, steps a) and d) are performed sequentially with respect to each other.

The intensity measurements are performed according to a given measurement procedure and may include steps such as the after-treatment of the primary signal in order to obtain representative digital values, the intermediate storage of the values and their correction for systematic measurement errors such as instrument characteristics, background intensity, etc.

In particular, the primary measured reflection intensity values may be expressed in terms of optical densities $D=\log_{10}(I_w/I)$; wherein $I_w$ is the light intensity reflected at a white reference background, and I is the light intensity reflected at the marking. Optical density values D have the property of being proportional to the concentration of the printed absorber.

The method of the invention is inherently related to the indicated requirements for authenticating an optically variable feature, as well as to the disclosed device. The illumination of the optically variable marking is provided simultaneously under all incident angles, ranging from substantially orthogonal (0°) to substantially grazing (90°) incidence. This is achieved through the use of a wide-angle illumination optics, such as a non-imaging optics element, preferably a Compound Parabolic Concentrator (CPC).

The method is further characterized in that reflected light is collected from at least two predefined observation angles, i.e. a first one near-orthogonal (preferably between 0° and 45°; even more preferably between 0° and 35°) and a second one near-grazing (preferably between 45° and 90°; even more preferably between 50° and 80°). Said reflected light is further preferably collected by the means of optical fibers, which lead it to corresponding photodetectors.

The illuminations, i.e. the qualities of light having different spectral characteristics, may be embodied by radiation emitted from light emitting diodes (LEDs), laser diodes (LDs), or still other light sources. Light conditioned by convenient optical filters may also be used in the context of the invention. It is not necessary to use spectrally narrow-banded light in the context of the present invention; the only requirement is that the different, sequentially applied illuminations, i.e. light qualities, must have substantially different optical spectra within the sensitivity range of the photodetectors used, such that a measurable effect can be detected on an appropriately colored marking.

It is further possible in the context of the present invention, to combine the authentication of optically variable properties with the measurement and evaluation of additional optical security elements. Using a different programming, the same method can include the measurement and evaluation of optical properties such as prompt or delayed photoluminescence emission in the UV, in the visible or in the IR range of the spectrum, including the measurement of time-dependent rise and decay characteristics of delayed luminescence emission. This is particularly useful for the authentication of luminescent optically variable devices, such as disclosed in WO 01/60924.

In another variant, the method combines the disclosed authentication of optically variable features with an additional authentication of a magnetic security element. This is particularly useful for the authentication of magnetic optically variable devices, such as disclosed in WO 02/073250.

In still another variant, the method of the present invention allows to discriminate between right-hand and left-hand circularly polarized light reflected from the marking.

In a further variant, the method of the present invention enables to define and store the reference values which are required to authenticate an optically variable feature under test using one and the same physical measurement and authentication device.

An important further shortcoming of the authentication methods and devices of the prior art arises noteworthy from the spread of their overall instrument characteristics (manufacturing tolerances between different devices of a same type). This spread of overall characteristics is unavoidable and due to the spread of characteristics of the device's individual electric and optic components, in particular the LEDs, the photodiodes and the analog electronics. The result of this spread is that different authentication devices of a same type perceive a same security feature in slightly different ways. Overcoming the tolerance problem in the prior art required an extensive final calibration of each individual device, in order to bring it to specifications.

This shortcoming is overcome, according to the present invention, by implementing a "learning mode" and a "testing mode" in the form of corresponding programmed algorithms comprised in the device.

Said "learning mode" is noteworthy embodied as a reference acquisition procedure, in which reflected light intensities of a reference item are measured for at least two predefined different observation angles and for at least 2 different qualities of illumination, and the corresponding results are stored as digital values in an internal permanent memory circuit of the authentication device.

Optionally, said reference acquisition procedure may further provide for an automatic determination of statistical mean values (expectation values) and acceptance forks (standard deviations). To this aim, a determined number of authentic samples are "shown" to the device, which measures them and calculates the said statistical values, which may then serve as acceptance/rejection criteria.

Said "testing mode" is embodied as a testing procedure, in which reflected light intensities of an item to be authenticated are measured for at least two predefined different observation angles and for at least 2 different qualities of illumination, and the corresponding results are compared with the previously stored respective values of a reference item, using a predefined comparison algorithm, and deriving a test result.

If both sets of values match according to a preestablished decision criterion, a first output signal may be generated indicating the sample's authenticity or passing the test; otherwise, a second output signal may be generated indicating the sample's non-authenticity, or failing of the test.

The provision for an "learning mode" and a "testing mode" within a same method enables noteworthy a flexible and versatile application of the authentication device, which needs not to be hardware-reprogrammed for each different application, nor either to contain an extended library of reference data. The reprogramming of the device can be performed in the easiest possible way, just by "showing" it one or more authentic samples.

A reference acquisition may be followed by a large number of testing operations, if documents or goods of a same type are to be checked. The possibility of performing the reference acquisition independently of the testing operations may also be useful in the context where a manufacturer wants to define the reference values at a service location, such that no reference items ("originals") need to be provided to his testing personnel.

It should be understood that the authentication device embodying the method may be produced in a large variety of different "flavors", i.e. that different series of the authentication device hardware may be equipped differently as to their light-emitting and light-receiving elements, as well as to their programming (implemented algorithms), in order to accommodate to different customer requirements and applications.

The advantages of the disclosed method and of the corresponding device over the prior art are noteworthy:
(i) one same type of device can serve a large number of different applications (versatile technology);
(ii) test and reference characteristics are measured using the very same hardware, which largely eliminates the instrument's influence, and thus the corresponding performance scattering, from the measurements (safe technology);
(iii) no supplementary disclosures have to be made as to the composition and properties of the security marking; the only requirement for performing a test is to be in possession of a certified original marking (secure technology).

The invention is now further illustrated with the help of the drawings and of the exemplary embodiments.

FIG. 1b shows an enlarged schematic drawing of the probe head of the device of FIG. 1a;

EXEMPLARY EMBODIMENT

Figure 1A:
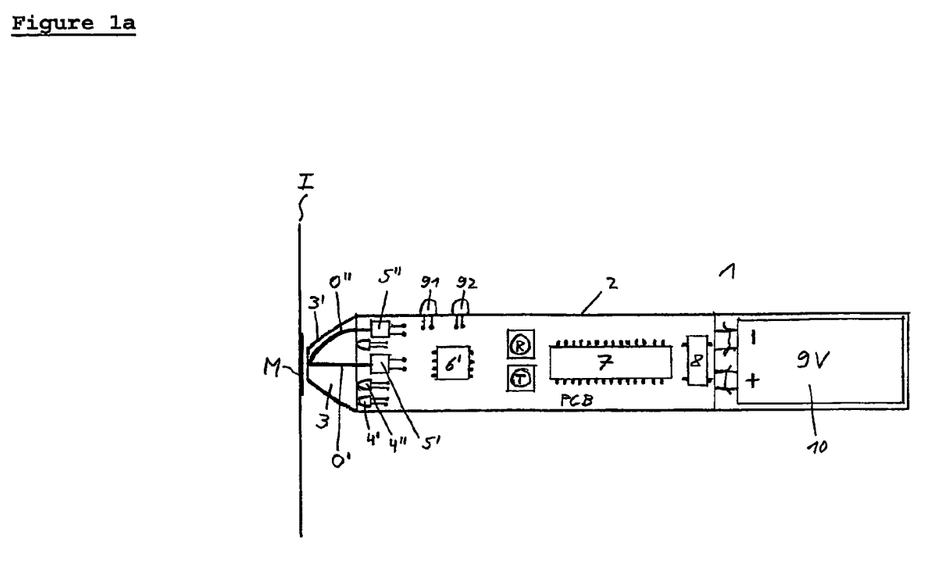
FIG. 1a shows a schematic-physical lay-out of an exemplary embodiment of an authentication device.
Figure 2:
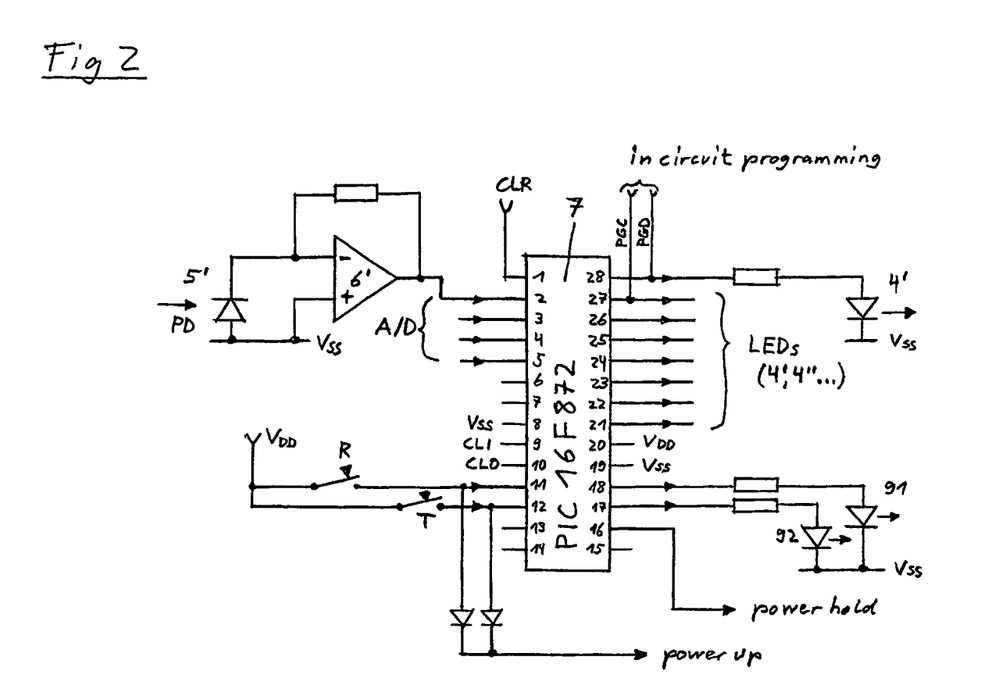
FIG. 2 shows a schematic electronic circuit diagram of an exemplary embodiment of a device.

A hand-held, battery-operated authentication device according to FIG. 1a and FIG. 2 was constructed for the electronically assisted comparison (authentication) of an optically variable marking M comprised on an item I with a corresponding reference marking.

The authentication device 1 (in FIGS. 1a, 1b) is comprised within a pen-shaped housing 2, and has a sensitive head 3 which is applied on top of the marking M to be examined. Said front end 3 is a flat Compound Parabolic Concentrator (CPC), made of acrylic glass (PMMA). Said CPC provides for a wide-angle illumination of the marking M under all incident angles, from substantially orthogonal to substantially grazing incidence, by each of a plurality of spectrally different light sources 4', 4", . . . . Two light guides O', O", disposed at angles of 0° (corresponding to near-orthogonal view) and 60° (corresponding to near-grazing view), with respect to the normal to the plane of the marking, collect reflected light from the marking and conduct it to two photodetectors 5', 5".

Figure 1B:
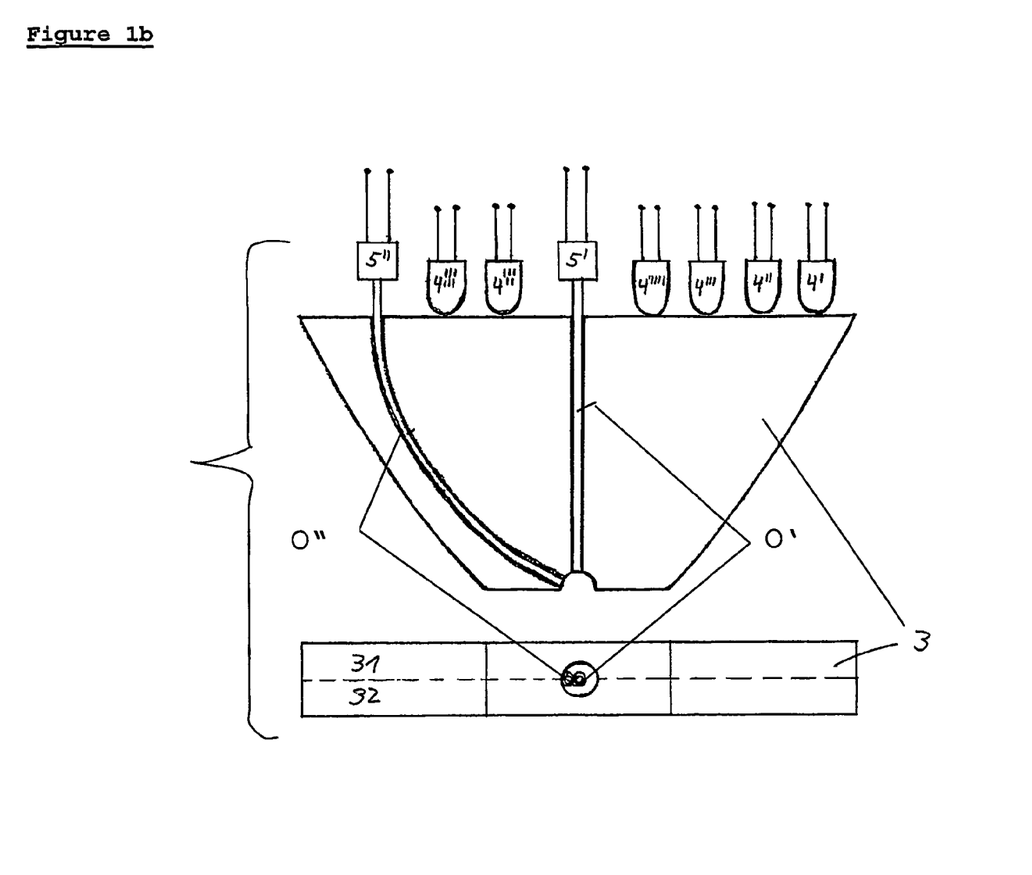
Figure 1C:
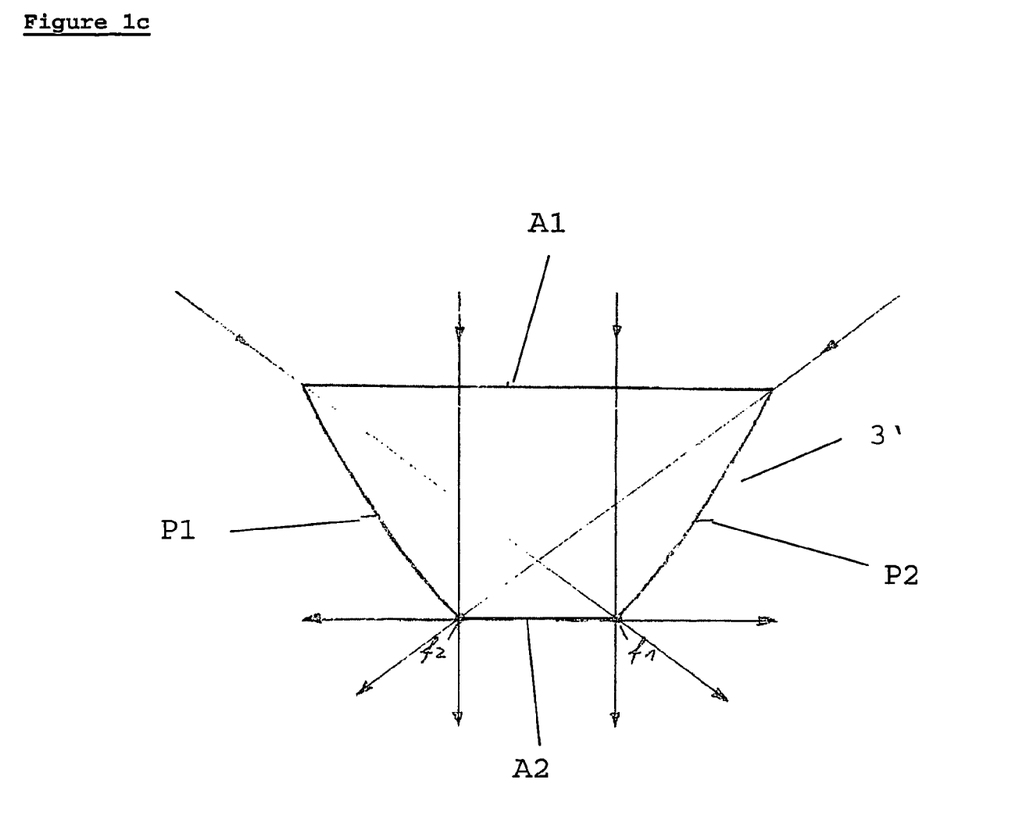
FIG. 1c schematically shows the working principle of a Compound Parabolic Concentrator (CPC) device.

Referring to FIG. 1b, the Compound Parabolic Concentrator (CPC) is designed such as to produce an exit-angle divergence of the light beam of 180°, assuring herewith a homogeneous wide-angle illumination of the optically variable marking M under all angles of incidence, regardless of the position of the light source (LED) at its opposite end. The CPC 3 is of the 2-dimensional slab type and comprises two acrylic glass slabs 31, 32 of the same shape, which are glued together at their inner surfaces with acrylic glue. Two grooves carved into the slab's inner surfaces serve to receive two optical fibers O', O" for collecting reflected light at near-orthogonal (0°) and at near-grazing (90°) angles, respectively, from the marking's surface and conducting it to the photodetectors 5', 5". The CPC 3 furthermore carries a reflecting metallic coating at its outer surfaces which are not involved in transmitting light.

In a variant, as shown in FIG. 1c, a hollow CPC 3' preferably of aluminum, having polished inner surfaces P1 and P2, may be used in place of the PMMA-CPC 3. The light (shown as arrows) provided by light sources (not shown) enters the CPC 3' through aperture A1 and exists through aperture A2. Optionally a cone-shaped (rotational-body). CPC can be employed, either in the form of a solid PMMA dielectric cone, which may furthermore have reflectively coated or mirrored outer surfaces, or of a hollow CPC having preferably a polished inner surface.

The light sources 4', 4", . . . are preferably chosen among the commercially available LED's, which exist for emission wavelengths ranging from the UV (300 nm) up to the mid IR (5,000 nm and beyond). They are preferably broad-angle emitting LEDs.

In a preferred embodiment, 8 LEDs are selected in the wavelength range between 350 nm and 2,500 nm, and even more preferred between 350 nm and 1,100 nm, e.g. as the following set of LEDs, obtainable from Roithner Lasertechnik, Vienna, Austria:

| Range | Type | wavelength; |
|---|---|---|
| UV: | 380D30 | 380 nm, 20 mA, 30°, 5 mm plastic |
| Blue: | HUBL-510L | 468 nm, 20 mA, 15°, 5 mm plastic |
| Green: | B5-433-B525 | 525 nm, 20 mA, 15°, 5 mm plastic |
| Yellow: | OPE5T59UY | 590 nm, 20 mA, 15°, 5 mm plastic |
| Red: | HURD-5101L | 660 nm, 20 mA, 18°, 5 mm plastic |
| IR1: | ELD-740-524 | 740 nm, 100 mA, 20°, 5 mm plastic |
| IR2: | OPE5T85 | 840 nm, 100 mA, 15°, 5 mm plastic |
| IR3: | ELD-950-525 | 950 nm, 100 mA, 20°, 5 mm plastic |

These wavelengths are chosen such as to cover the 350 nm to 1,100 nm area in an about equally spaced manner, as well as to be compatible with the embodiment of the device disclosed hereafter.

For particular applications, the LEDs can be selected such as to comprise more LEDs in a particular wavelength region, e.g. the IR region between 700 and 1,100 nm, as follows (LEDs from the same source as above):

| Range | Type | wavelength |
|---|---|---|
| UV: | 380D30 | 380 nm |
| IR1: | ELD-740-524 | 740 nm |
| IR2: | ELD-780-514 | 780 nm |
| IR3: | ELD-840-515 | 840 nm |
| IR4: | ELD-880-525 | 880 nm |
| IR5: | IR383 | 940 nm |
| IR6: | LED-970-06 | 970 nm |
| IR7: | LED-1050-03 | 1'050 nm |

This embodiment is particularly suited to sense a variety of invisible infrared features ('infrared colors') in the 700 nm to 1,100 nm range, together with infrared luminescence emission excitable by long wave (360 to 400 nm) UV light.

The embodiment may also comprise a selection of LEDs emitting in the farther infrared (1,100 to 2,500 nm), like (same source):

| Type | wavelength; |
|---|---|
| LED-1300-03 | 1'300 nm; 1.0 mW @ 50 mA; 30°, 5 mm plastic |
| LED-1450-03 | 1'450 nm; 1.0 mW @ 50 mA; 30°, 5 mm plastic |
| LED-1550-03 | 1'550 nm; 1.0 mW @ 50 mA; 30°, 5 mm plastic |
| LED17 | 1'700 nm; 1.0 mW @ 80 mA; |
| LED19 | 1'900 nm; 1.0 mW @ 80 mA; |
| LED20 | 2'000 nm; 1.0 mW @ 80 mA; |
| LED21 | 2'100 nm; 1.0 mW @ 80 mA; |
| LED23 | 2'300 nm; 0.75 mW @ 80 mA; |

The device according to the present invention comprises at least two photodetectors. In a preferred embodiment, said photodetector is sensitive to light comprised in the wavelength range between 200 nm and 2,500 nm, but it is also possible to use detectors which are sensitive to wavelengths above or below this range. The photodetector may furthermore be of any solid-state or other type, i.e. a photodiode, an avalanche diode, a phototransistor, a photoresistor, a charge coupled device, a photomultiplier, a bolometric, a thermopile or a pyroelectric detector etc., and it may have broad-band or narrow-band spectral sensitivity.

In a preferred embodiment, the photodetector is a photodiode, connected to a current-to-voltage (transimpedance) type amplifier, in order to deliver a signal comprised in a useful voltage range to a subsequent analog-to-digital converting circuit. Silicon photodiodes of the PN or the PIN type are used in the most preferred embodiment; they are intrinsically sensitive in the 200 nm to 1,100 nm wavelength range. Devices of this kind are, among other sources, available from Hamamatsu Photonics, e.g.:

| S1336-5BQ PN | 190 to 1'100 nm, 2.4 × 2.4 mm active surface |
|---|---|
| S7329-01 PIN | 320 to 1'060 nm, 2.0 × 2.0 mm active surface |

For particular applications, a photodiode with integrated pre-amplifier is preferred, in order to limit the influence of electric environment noise, e.g.: the Hamamatsu S8745 or Hamamatsu S8746 types of integrated photodetectors.

For spectral sensitivity in the extended IR range (900 to 2,500 nm), InGaAs photodiodes may be used, e.g. the Hamamatsu G8372-03 900 to 2,100 nm. GaAsP photodiodes are suitable for the visible range (400 to 760 nm), e.g. the Hamamatsu G1736 device; and GaP photodiodes are suitable for the UV to green range (190 to 550 nm), e.g. the Hamamatsu G1962 device. The SiC detectors of Laser Components, USA, are inherently sensitive only to the UV (210 to 380 nm) wavelength range.

The authentication device of the embodiment comprises electronic circuitry built around a PIC16F872 processor 7. This processor has a 35-elements RISC instruction set, 2 K×14 words of Flash program memory, 128×8 bytes of RAM data memory, 64×8 bytes of EEPROM data memory, a built-in 5-channel 10 bit A/D converter, and is able to work at clock speeds up to 20 MHz. The processor is furthermore fully in-circuit serially programmable, enabling its programming or reprogramming independent of the manufacturing. It is available as a standard chip in a DIL 28-pin package, running on a single 5 V power supply.

In the embodiment, the PIC processor 7 drives up to 8 illuminator LEDs 4', 4", . . . of different emission wavelengths (assigned to pins 21 to 28), two indicator LEDs 91, 92 (e.g. a green and a red LED; assigned to pins 17, 18), and optionally a buzzer for audible output (e.g. assigned to pin 15). A further output line (pin 16) is dedicated to the auto-power-hold function via the power-management circuit 8. The processor's output pins support up to 25 mA load in current-sink mode, allowing a direct, unbuffered driving of LEDs and buzzer.

The PIC processor 7 has an integrated 10-bit A/D converter (yielding 1024 digital steps between two selectable voltage references; usually taken as 0 V and a stabilized 5V source), whose analog input can be assigned to 5 different I/O pins. The detecting device can thus be equipped with two or more photodetectors 5', 5", each of them being connected to the input of a corresponding current-to-voltage converter/amplifier stage 6', 6". The photodetectors 5', 5" of the present embodiment are photodiodes, driven either in photovoltaic or in photoconductive mode; in the given example (FIG. 2) the photovoltaic mode is used. The current-to-voltage converters 6', 6" have appropriately adjusted amplification factors to deliver a signal within the useful voltage range to the processor's A/D converter inputs (pins 2 to 5). If necessary, a variable-gain function for these amplifiers, controlled by the processor 7, can be implemented as well.

In a particular embodiment for discriminating between reflected right-hand and left-hand circularly polarized light, four photodiodes mounted behind four circular polarization filters are used, noteworthy each a photodiode for orthogonal and for grazing view mounted behind each a left-hand and a right-hand circular polarization filter. The circular polarization filters may, of course, also be inserted at another place in the optical path between the reflecting marking and the photodiodes.

Two digital input lines (pins 11, 12) of the PIC processor 7 are used to read the "Reference" and the "Test" pushbutton switches R and T. Both of said switches, in addition to their indicated function, independently power-up the device via the power management circuit 8 and, indirectly, trigger the PIC processor's 7 auto-reset function. The power-up functionality is implemented in the form of an electronic switch, acting on the device's general power supply circuit 8.

After powering-up, the processor 7 initializes itself and sets the power-hold pin to the on-state, before reading the switches R and T and starting the appropriate processing sequence ("reference acquisition" or "test"). The power-hold pin keeps the general power switch on, even if the pushbutton has been released in the mean time.

After termination of the processing sequence, including the output of the operation result during a predetermined waiting time, the processor 7 switches the power-hold pin to the off-state, causing the whole authentication device to switch off.

The PIC processor's I/O functionality is thus provided as follows:

| | |
|---|---|
| 8 pins for driving the illuminator LEDs | (output) |
| 1 pin for driving the power-hold switch | (output) |
| 2 pins for driving the indicator LEDs | (output) |
| 1 pin for driving the buzzer (optional) | (output) |
| 2 pins for reading the pushbuttons | (input) |
| 4 pins for reading up to 4 photodiodes | (input A/D) |
| 2 pins for in-circuit programming | (input) | which results in a use of totally 19 or 20 I/O lines. The additional I/O lines of the processor can be assigned to supplementary functions, noteworthy to a serial data transfer connector for communication, monitoring and debugging purposes.

With reference to FIG. 1*a*, the electronic circuit of the device is contained on a printed circuit board (PCB), the PIC16F872 processor 7, a 5 V power stabilizer 8, a quartz resonator (4 MHz, not shown), components for the auto-power-hold function, two pushbutton switches (R, T), two indicator LEDs 91, 92 with resistors, a (optional) buzzer (not shown), eight illuminator LEDs 4', 4", . . . of different wavelengths (UV, blue, green yellow, orange, red, IR1, IR2) with corresponding resistors, two photodiodes 5', 5", two transimpedance op-amps 6', 6" with corresponding feed-back resistors, as well as the connectors for in-circuit programming and monitoring purposes (not shown).

The authentication device further comprises two push-button switches R and T (labeled "Reference" and "Test"), which are both enabled to activate the device's power supply 8 when pressed, in addition to trigger their specific functions of "reference value definition" and "sample testing", respectively.

The power supply 8 remains active after releasing the pushbuttons until the processor 7 shuts itself down after completed operations.

The device comprises two LED indicators, a green one 91 for "passed" and a red one 92 for "failed", to indicate the operation's result. Optionally, a buzzer may also be present, to output an audible control signal. When pushbutton R ("Reference") is pressed, the device measures the optical characteristics of a reference sample and stores the corresponding digital values in a permanent memory of the processor 7. The "passed" indicator 91 is set to indicate the successful termination of the reference acquisition. The device switches itself off after a predefined short waiting time. When pushbutton T ("Test") is pressed, the device measures the optical characteristics of a test sample and compares the corresponding digital values with the previously stored values of the reference sample, according to a predefined algorithm stored in a memory of the processor 7. The green "passed" indicator 91 is set to indicate a positive authentication result, whereas the red "failed" indicator 92 is set to indicate a negative authentication result, according to a pre-established criterion. The device switches itself off after a predefined short waiting time.

The device of the exemplary embodiment was designed to run on a standard 9V battery block 10 which is down-stabilized by the power management circuit 8 to obtain the required 5 V operating voltage. The entire circuit board (PCB) is lodged within a housing 2 comprising as well a battery holder 10 for a 9V pile or battery, and a PMMA CPC 3 as the illuminating/collecting optical component.

This modular authenticating device embodying the method of the invention is in first instance laid out for the authentication of samples against certified reference items, by comparing reflected light intensities at two different angles for 8 or more different qualities of illumination in the UV, visible or NIR part of the spectrum. These qualities of illumination are noteworthy given by the emission spectra of the corresponding illuminator LEDs 4', 4", . . . , which can thus be chosen to fit any particular type of application.

The skilled in the art, based on the disclosure given herein, is able to conceive a large number of alternative embodiments. Noteworthy, he may choose to use more than 8 LEDs in order to enhance the spectral discrimination, or he may choose to use less than 8 LEDs and to assign the free I/O pins to supplementary input or output functions, such as additional photodetectors or a display unit. He may also choose to use more than two collecting fibers O and photodetectors 5', in order to enhance still further the discriminating power of the device for angle-dependent spectrally variable features.

Referring now to the method for authenticating an item carrying a marking which exhibits predefined, particular optical characteristics. In detail, the method can be considered as comprising of a first, "reference acquisition" part, and a second, "testing" part, which may be performed independently and separated in time and space from each other.

Figure 3A:
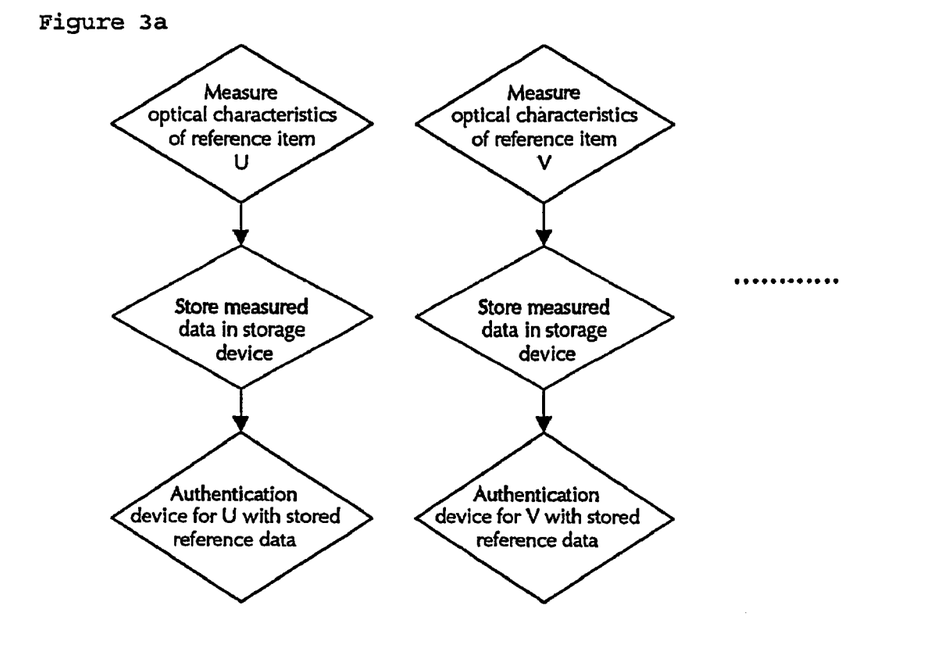
FIG. 3a shows flow schemes of reference acquisition steps performed on different reference items.
Figure 3B:
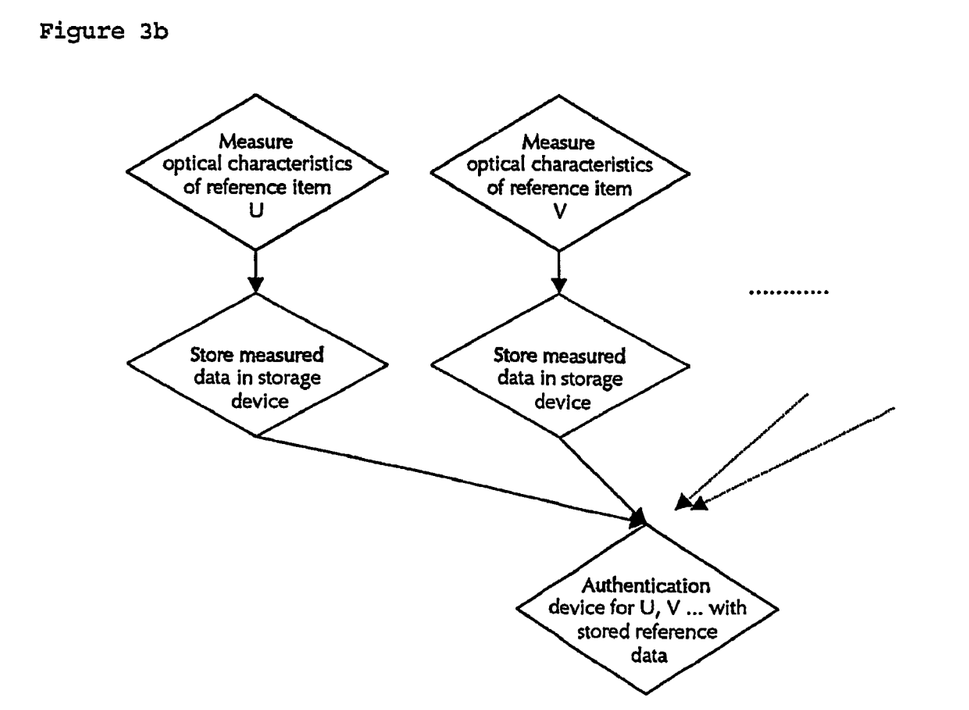
FIG. 3b shows a flow scheme of reference acquisition steps performed on different reference items and storage of the measured data in the memory of one authenticating device.

FIGS. 3*a* and 3*b* illustrate in detail the reference acquisition part of the method, wherein the authentication device is used for measuring and storing reference reflectance data of a marking on a reference item:

a) sequentially illuminating said marking with at least two illuminations, i.e. qualities of light having different spectral characteristics;

b) for each illumination step under a), collecting light reflected by said marking at least at two predefined different observation angles with respect to the plane of the marking and measuring its intensity;

c) storing the measured intensity values of step b) in a permanent digital memory.

According to FIG. 3a, the reference acquisition is performed separately for each different reference item U, V, . . . . The authentication device can only be used for the authentication of one determined item at a time.

In a second example of the reference acquisition, according to FIG. 3b, several reference items U, V, . . . are measured and their data are stored together in a same authenticating device, which may then serve for the authentication of multiple, different items.

Figure 4A:
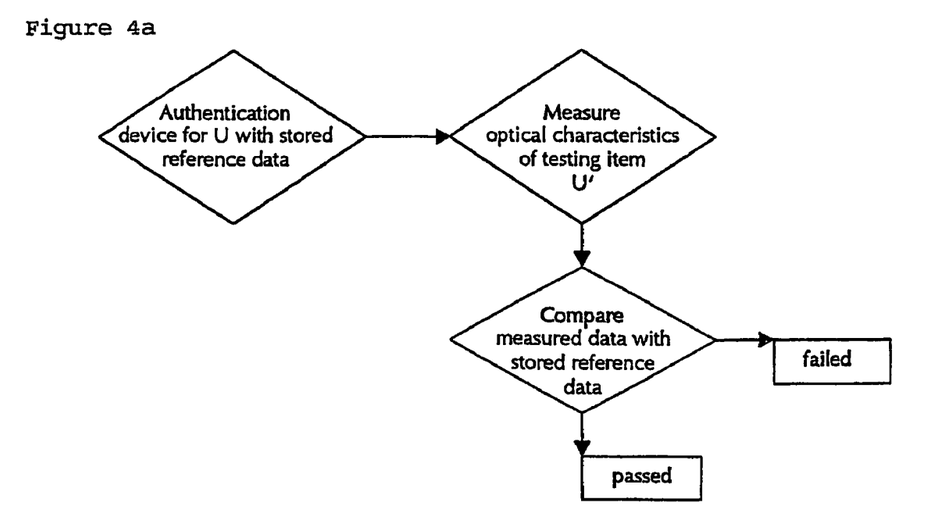
FIG. 4a shows a flow scheme of an authentication process.
Figure 4B:
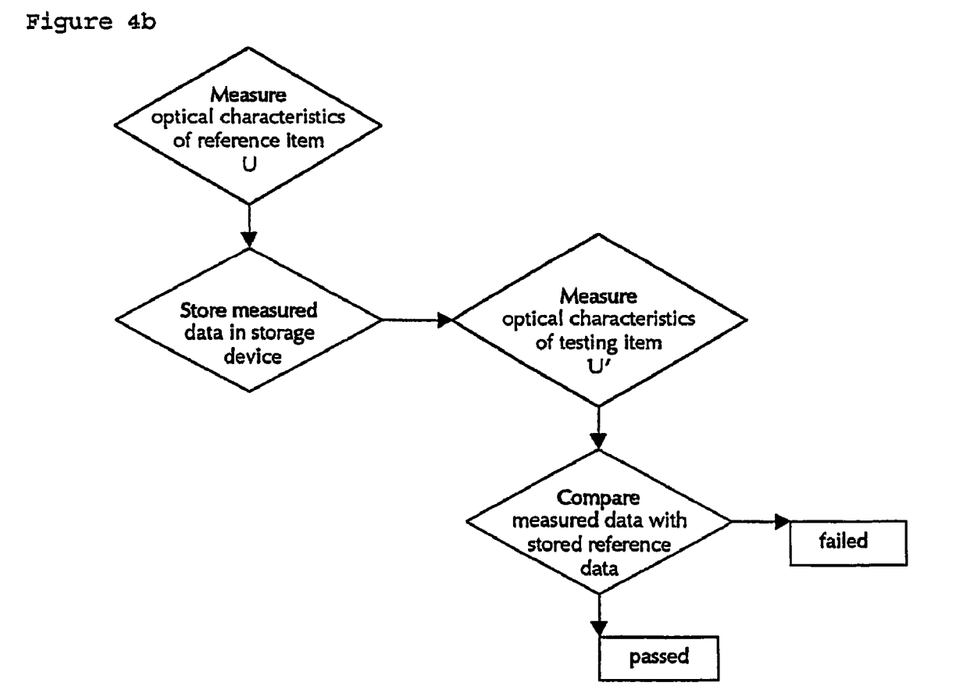
FIG. 4b shows a flow scheme of an authentication process using previously acquired and stored reference values.

FIGS. 4a and 4b illustrate in detail the testing part of the authentication method according to the invention, wherein the authentication device, comprising previously stored reference data, is used for comparing reflectance data of a marking on an item under test with said previously stored reference data:

d) sequentially illuminating said marking with at least two illuminations, i.e. qualities of light having different spectral characteristics, as in step a);

e) for each illumination step under d), collecting light reflected by said marking at least at two predefined different observation angles with respect to the plane of the marking and measuring its intensity;

f) comparing said measured intensity values of step e) with previously stored corresponding reference values according to a predefined algorithm, and deriving a authenticity indicator from the comparison result using a pre-established decision criterion.

The embodiment shown in FIG. 4a enables a user to check security markings without having himself to previously acquire reference data or to calibrate the authentication device. The acquired corresponding data from U' are compared with stored digital reference data from U according to a pre-programmed algorithm and a decision criterion, and an indication regarding the authenticity of the marking is displayed ("passed" or "failed").

The embodiment shown in FIG. 4b enables the user himself to acquire the reference reflectance data from a reference item U, prior to checking the authenticity of a test item U' with the same authentication device. Likewise, test and reference data are compared in digital form using pre-programmed algorithm and a decision criterion, and an indication regarding the authenticity of the security marking is derived and displayed ("passed" or "failed").

An inherent advantage of the method disclosed herein over the methods of the prior art is its large tolerance to fluctuations in the hardware specifications of the device: A same device is used to compare an item under test with a certified authentic reference item. Such a task does not require absolute values of physical quantities to be measured and compared; it is indeed sufficient to compare the item under test, such as it is seen by the authentication device in question, with the reference item, such as it is seen by the same authentication device. This noteworthy allows to relax on stringent component specifications, and therefore to lower the production cost of the authentication device.

The authenticating device according to the invention may be laid out for the measurement and comparison of supplementary optical properties, in addition to the diffuse reflectance properties of optically variable (color changing) surfaces; such further properties include prompt and delayed luminescence emission and time-dependent luminescence characteristics. This can be achieved through an appropriate programming of the processor or controller, in conjunction with the corresponding hardware, in order to execute the required illumination-detection sequences and signal analysis routines.

Magnetic properties can be assessed analogously, by adding a magnetic sensor to the device and connecting is output, after appropriate pre-amplification, to an A/D converter input of the microcontroller circuit, and by providing for appropriate programming of the device.

According to an embodiment of the authentication method, and with reference to FIG. 2, a sample having a marking exhibiting a viewing-angle dependent light reflection spectrum, is authenticated. The authentication device has a probe head according to FIG. 1b, comprising 8 different LEDs 4', 4", . . . , 4''''''', connected to 8 output lines of the processor 7 (pins 21 to 28) and emitting in the UV, visible and infrared (350 to 1,050 nm) range of the spectrum. The device has further two photodiodes 5', 5" which are sensitive to the entire range of emission (350 to 1,050 nm) of said LEDs. Said photodiodes 5', 5" are connected to transimpedance amplifiers 6', 6" of moderate amplification factor, which in turn deliver their output signal to an analog-to-digital converter (A/D) of the processor 7 (pins 2, 3).

The probe head of the authentication device is applied on top of the marking and the authentication procedure is started by either pressing the pushbutton "Test", or the pushbutton "Reference". After powering up and initializing, the processor 7 sequentially switches on the 8 LEDs 4', 4", . . . , and for each step i of this sequence, reads into its working memory two digital values, Io(i) and Ig(i), which are obtained from the signals delivered by the photodiodes 5', 5" through the amplifiers 6', 6" to the A/D-converters of the processor 7 (pins 2, 3). Said values are representative of the light intensity reflected from the marking's surface at near-orthogonal angle (Io(i)) and near-grazing angle (Ig(i)) for the given illumination quality i. Finally, 16 values, corresponding to the intensity results for the 8 LED's, are available and constitute a crude representation of the sample diffuse reflectance spectra at both, near-orthogonal and near-grazing reflection angles for the examined illumination qualities.

In an alternative embodiment of the method, said measured values can additionally be corrected for systematic measurement errors, such as the effects of background radiation or of slowly varying instrument parameters (light intensity, etc.). Data, algorithms and parameters for performing such correction may be contained in the device's internal memory.

In a variant, the reference acquisition may also be done with respect to a white reference, and optical density values D may be derived, according to the formula $D = \log_{10}(I_w/I)$; $I_w$=reflected intensity of the white reference; I=reflected intensity of the marking under the same conditions. The white reference values $I_w$ are preferably stored, in order to serve for the same purpose in the following testing operations.

In a "reference acquisition" cycle, the obtained values are now transferred as reference values IoR(i), IgR(i) into a permanent memory of the processor 7, and the end of the operation is acknowledged. After a short waiting time, the processor 7 powers down the device.

In a "testing" cycle, the value pairs Io(i), Ig(i) are now compared with stored reference value pairs IoR(i), IgR(i), previously obtained from a reference sample using the same measurement geometry, conditions and equipment. Said comparison may be done by taking the differences do(i)=Io(i)−IoR(i), dg(i)=Ig(i)−IgR(i) and by, e.g., summing up the squares of the deviations:

$$S = \Sigma do(i)^2 + dg(i)^2 \text{ (Sum over all } i\text{)}$$

or, alternatively, the absolute values:

$$S=\Sigma|do(i)|+|dg(i)| \text{ (Sum over all } i\text{)}$$

S, being a measure for the fit of measured and reference values, can finally be tested against a predefined criterion, in order to decide whether the sample under test is taken for authentic or not. The authentication result is displayed, and the end of the operation is acknowledged. After a short waiting time, the processor 7 powers down the device.

Given the immediate response of light reflection to illumination dynamics and the relatively large available signal intensities, the whole measurement cycle or sequence can be performed quite rapidly, typically not lasting more than about a millisecond. This makes the method and the device equally suitable for high- and for low-speed authentication applications.

The invention claimed is:

1. A method for determining the authenticity of an item, the item carrying a marking exhibiting a viewing-angle dependent light reflection spectrum, the method comprising steps of
   a) illuminating said marking with at least a first light source having first spectral characteristics;
   b) collecting light reflected by said marking at least at two predefined different observation angles with respect to the plane of the marking, and measuring its respective intensity;
   c) illuminating said marking with at least a second light source having second spectral characteristics;
   d) collecting light reflected by said marking at least at two predefined different observation angles with respect to the plane of the marking, and measuring its respective intensity; and
   e) comparing said measured intensity values of steps b) and d) with previously stored corresponding reference values according to a predefined algorithm, and deriving an authenticity indicator from the comparison result using a preestablished decision criterion;
   wherein the illumination in each of steps a) and c) is a wide-angle illumination provided through a Compound Parabolic Concentrator (CPC).

2. The method according to claim 1, wherein the item is selected from the group consisting of a security document, a valued good or a packaging.

3. The method according to claim 1, wherein a first of said at least two predefined observation angles is chosen between 0° and 45°, and a second of said observation angles is chosen between 45° and 90°, with respect to normal to the plane of the marking.

4. The method according to claim 1, wherein a first of said at least two predefined observation angles is chosen between 0° and 35°, and a second of said observation angles is chosen between 50° and 80°, with respect to normal to the plane of the marking.

5. The method according to claim 1, wherein said light reflected by said marking at said observation angles is collected by the means of optical fibers.

6. The method according to claim 1, wherein the intensity of said light reflected by said marking at said observation angles is measured after passage of said light through an optical filter.

7. The method according to claim 6, wherein said optical filter is a left-or a right-handed circular polarization filter.

8. The method according to claim 1, wherein at least one of said illuminations having different spectral characteristics is provided by a light-emitting diode (LED).

9. The method according to claim 1, wherein at least one of said illuminations having different spectral characteristics is provided by laser diode (LD).

10. The method according to claim 1, wherein at least one of said illuminations having different spectral characteristics is provided by a light source equipped with an optical filter.

11. The method according to claim 1, wherein a prompt or delayed photoluminescence emission from said marking, in the UV-, the visible-, or the IR-range of the electromagnetic spectrum, is measured in addition to said viewing-angle dependent light reflection spectrum.

12. The method according to claim 1, wherein a magnetic property of the marking is measured in addition to said viewing-angle dependent light reflection spectrum.

13. The method according to claim 1, wherein said measured values and said previously stored corresponding reference values are obtained using the same physical device.

14. A device for determining the authenticity of an item, carrying a marking exhibiting a viewing-angle dependent light reflection spectrum; said device comprising
   at least two light sources having different spectral characteristics for providing sequential illumination to said marking;
   at least two photodetectors with optional collection optics for collecting light reflected by said marking at least at two predefined, different observation angles and delivering an electric signal corresponding to the collected light intensity;
   analog-to-digital converting, processing, controlling and memory means, for controlling the light sources, digitizing and storing reflected intensity values, for comparing said intensity values with previously stored corresponding reference values, and for deriving an authenticity indicator from the comparison result, all according to a predefined algorithm and using a pre-established decision criterion;
   wherein the device comprises a wide-angle illumination optics for guiding the light of said light sources to said marking, wherein said wide-angle illumination optics is a Compound Parabolic Concentrator (CPC).

15. The device according to claim 14, wherein the item is selected from the group consisting of a security document, a valued good or a packaging.

16. The method according to claim 14, wherein a first of said at least two predefined observation angles is chosen between 0° and 45°, and a second of said observation angles is chosen between 45° and 90°, with respect to normal to the plane of the marking.

17. The method according to claim 14, wherein a first of said at least two predefined observation angles is chosen between 0° and 35°, and a second of said observation angles is chosen between 50° and 80°, with respect to normal to the plane of the marking.

18. The device according to claim 14, further comprising at least one optical fiber for collecting said light reflected by said marking at said observation angles.

19. The device according to claim 14, further comprising at least one optical filter through which said light reflected by said marking at said observation angles is measured.

20. The device according to claim 19, wherein said optical filter is a left- or a right-handed circular polarization filter.

21. The device according to claim 14, wherein at least one of said light sources is a light-emitting diode (LED).

22. The device according to claim 14, wherein at least one of said light sources is a laser diode (LD).

23. The device according to claim 14, wherein at least one of said light sources is equipped with an optical filter.

24. The device according to claim 14, wherein it supports a programmed learning mode for determining reflected intensity values on a reference item and storing them as reference values in a digital memory, and a programmed testing mode for determining reflected intensity values on an item to be authenticated and comparing them with said previously determined and stored reference values, thereby deriving said authenticity indicator.

* * * * *